United States Patent
Suzuki

(10) Patent No.: US 8,690,367 B2
(45) Date of Patent: Apr. 8, 2014

(54) DOOR MIRROR

(75) Inventor: Kentaro Suzuki, Fujieda (JP)

(73) Assignee: Murakami Corporation, Shizuoka (JP)

( * ) Notice: Subject to any disclaimer, the term of this patent is extended or adjusted under 35 U.S.C. 154(b) by 94 days.

(21) Appl. No.: 13/560,355

(22) Filed: Jul. 27, 2012

(65) Prior Publication Data

US 2013/0070353 A1 Mar. 21, 2013

(30) Foreign Application Priority Data

Sep. 20, 2011 (JP) ................. P2011-205285

(51) Int. Cl.
*G02B 7/182* (2006.01)
*B60R 1/06* (2006.01)

(52) U.S. Cl.
USPC .......................... 359/872; 359/877

(58) Field of Classification Search
USPC ............ 359/841, 872, 874, 876, 877
See application file for complete search history.

(56) References Cited

U.S. PATENT DOCUMENTS

| | | | | |
|---|---|---|---|---|
| 4,693,571 A * | 9/1987 | Kimura et al. | | 359/874 |
| 4,701,037 A * | 10/1987 | Bramer | | 359/874 |
| 4,815,837 A * | 3/1989 | Kikuchi et al. | | 359/874 |
| 4,915,493 A * | 4/1990 | Fisher et al. | | 359/874 |
| 4,930,370 A * | 6/1990 | Yoshida | | 74/502.1 |
| 5,583,703 A * | 12/1996 | Lang et al. | | 359/877 |
| 5,621,577 A * | 4/1997 | Lang et al. | | 359/872 |
| 5,724,200 A * | 3/1998 | Mochizuki | | 359/877 |
| 5,896,238 A * | 4/1999 | Hubscher et al. | | 359/877 |
| 6,132,052 A * | 10/2000 | Huizenga et al. | | 359/877 |
| 6,213,612 B1 * | 4/2001 | Schnell et al. | | 359/877 |
| 6,357,885 B2 * | 3/2002 | Sakamoto et al. | | 359/877 |
| 7,137,717 B2 * | 11/2006 | Ohashi | | 359/877 |

FOREIGN PATENT DOCUMENTS

JP 2003-285690 10/2003

* cited by examiner

*Primary Examiner* — Ricky D Shafer
(74) *Attorney, Agent, or Firm* — Greenblum & Bernstein P.L.C.

(57) ABSTRACT

A mirror housing of an electric door mirror is provided with a partition wall for partitioning a mirror accommodating space and a harness accommodating space. The partition wall is provided with an opening portion for exposing a terminal portion of a mirror surface angle adjusting unit to the harness accommodating space. A peripheral edge portion of the opening portion is provided with a claw portion elastically deformed when a connector portion is pushed to the terminal portion and elastically recovered to be opposed to a back face of the connector portion to thereby prevent detachment of the connector portion after connecting the connector portion to the terminal portion. Further, a peripheral edge portion of the opening portion is provided with a guide portion for restricting a movement of the connector portion against an elastic force of the claw portion.

4 Claims, 7 Drawing Sheets

DOOR MIRROR

CROSS-REFERENCE TO RELATED APPLICATIONS

This application claims priority to Japanese Patent Applications No. 2011-205285 filed on Sep. 20, 2011, the entire contents of which are incorporated by reference herein.

BACKGROUND OF THE INVENTION

1. Field of the Invention

The present invention relates to a door mirror to be applied to a vehicle of a passenger car or the like.

2. Related Background of the Invention

In a prior art, in such a field, there is a door mirror including a mirror module, a mirror angle adjusting unit (hereafter, a mirror surface angle adjusting unit), and a visor which accommodates the mirror and the mirror surface angle adjusting unit (hereinafter, a mirror housing) (refer to, for example, Patent Document 1). According to the door mirror described in Patent Document 1, there is provided a harness connecting portion (hereinafter, terminal portion) to which a feeding connector portion of a harness which supplies an external power is connected on a back face side of the mirror surface angle adjusting unit. Also, the mirror housing is provided with a partition wall which partitions an inner space thereof to a first space on a front side and a second space on a rear side and fixes the mirror surface angle adjusting unit that is accommodated in the second space. The partition wall is provided with an opening portion which exposes the terminal portion of the mirror surface angle adjusting unit to the first space. Thereby, the feeding connector portion can easily be connected to the terminal portion after accommodating the mirror surface angle adjusting unit in the second space.

[Patent Document 1] Japanese Patent Laid-Open No. 2003-285690

SUMMARY OF THE INVENTION

Problems that the Invention is to Solve

However, according to the door mirror of the related prior art described above, there is a concern that the harness is pulled at an operating step after connecting the feeding connector portion to the terminal portion, and the feeding connector portion is detached from the terminal portion.

It is an object of the present invention to provide a door mirror which can easily connect a feeding connector portion to a terminal portion and can prevent detachment of the connected feeding connector portion.

Means to Solve the Problems

A door mirror according to the present invention is characterized in that a door mirror includes a mirror holder fixed with a mirror, a mirror surface angle adjusting unit for adjusting an angle of the mirror holder, and a mirror housing for accommodating the mirror holder and the mirror surface angle adjusting unit, wherein a back face side of the mirror surface angle adjusting unit is provided with a terminal portion to which a feeding connector portion of a harness for supplying an external power is connected, the mirror housing is provided with a partition wall for partitioning an inner space of the mirror housing to a first space on a front side and a second space on a rear side, the partition wall is provided with an opening portion for exposing the terminal portion of the mirror surface angle adjusting unit accommodated in the second space to the first space, and a peripheral edge portion of the opening portion is provided with: a claw portion elastically deformed in a direction orthogonal to a direction of pushing the feeding connector portion by the feeding connector portion when the feeding connector portion is pushed to the terminal portion from a side of the first space, and elastically recovered to be opposed to a back face of the feeding connector portion in the midst of pushing the feeding connector portion; and a guide portion extended along the pushing direction to be opposed to the claw portion for restricting a movement of the feeding connector portion against an elastic force of the claw portion.

According to such door mirror, the terminal portion of the mirror surface angle adjusting unit is exposed to the first space of the mirror housing by the opening portion of the partition wall of the mirror housing. When the feeding connector portion is pushed to the terminal portion from the side of the first space, the claw portion provided at the peripheral edge portion of the opening portion is elastically deformed in the direction orthogonal to the pushing direction. At this occasion, the guide portion restricts the movement of the feeding connector portion against the elastic force of the claw portion, and therefore, in the connecting operation, a positional shift of the feeding connector portion relative to the terminal portion is prevented, and the feeding connector portion can firmly and easily be connected to the terminal portion. When the feeding connector portion is further pushed, the claw portion is elastically recovered to be opposed to the back face of the feeding connector portion. It can clearly be recognized that the feeding connector portion is connected to the terminal portion by sound or feeling when the claw portion is elastically recovered. Also, detachment of the feeding connector portion after connection can be prevented by the claw portion elastically recovered to be opposed to the back face of the feeding connector portion.

An end portion of the guide portion on a side of the terminal portion is formed with an auxiliary claw portion elastically deformed in the direction orthogonal to the pushing direction and elastically recovered to be opposed to the back face of the feeding connector portion in the midst of pushing the feeding connector portion. In this case, the auxiliary claw portion is opposed to the back face of the feeding connector portion, and therefore, the detachment of the connected feeding connector portion can further firmly be prevented by cooperative operation of the claw portion and the auxiliary claw portion.

Further, the claw portion is formed into a U-like hook shape projected to the first space along the pushing direction and folded to bend on a side of the opening portion at a middle thereof. In this case, in comparison with the claw portion formed into a shape of simply being projected to the first space, a length from a root portion to a tip end portion of the claw portion is prolonged. That is, an elastically deformable portion is prolonged, and therefore, the elastic force of the claw portion is reduced, and a force of clamping the feeding connector portion by the claw portion and the guide portion is reduced. Therefore, the feeding connector portion can be connected to the terminal portion by a smaller force.

Further, the door mirror further includes plural fastening components for fixing the mirror surface angle adjusting unit in the mirror housing, wherein the back face side of the mirror surface adjusting unit is further provided with plural fixing portions to which the plural fastening components are fastened respectively, the partition wall is further provided with plural insertion holes disposed to surround the opening portion for penetrating the plural fastening components respectively to be fixed to the plural fixing portions from the side of the first space, and plural reinforcing tube portions surrounding the respective insertion holes and projected to the first space along the pushing direction, and the guide portion is provided at a peripheral face of the reinforcing tube portion. In this case, the guide portion can be projected into the opening portion by using the reinforcing tube portion.

Advantage of the Invention

According to the door mirror of the present invention, the feeding connector portion can easily be connected to the terminal portion, and the detachment of the connected feeding connector portion can be prevented.

DESCRIPTION OF THE PREFERRED EMBODIMENTS

A detailed explanation will be given of a preferred embodiment of a door mirror according to the present invention with reference to the drawings as follows. Incidentally, "front and rear" in a door mirror is expressed in accordance with a front and rear direction of a vehicle.

Figure 1:
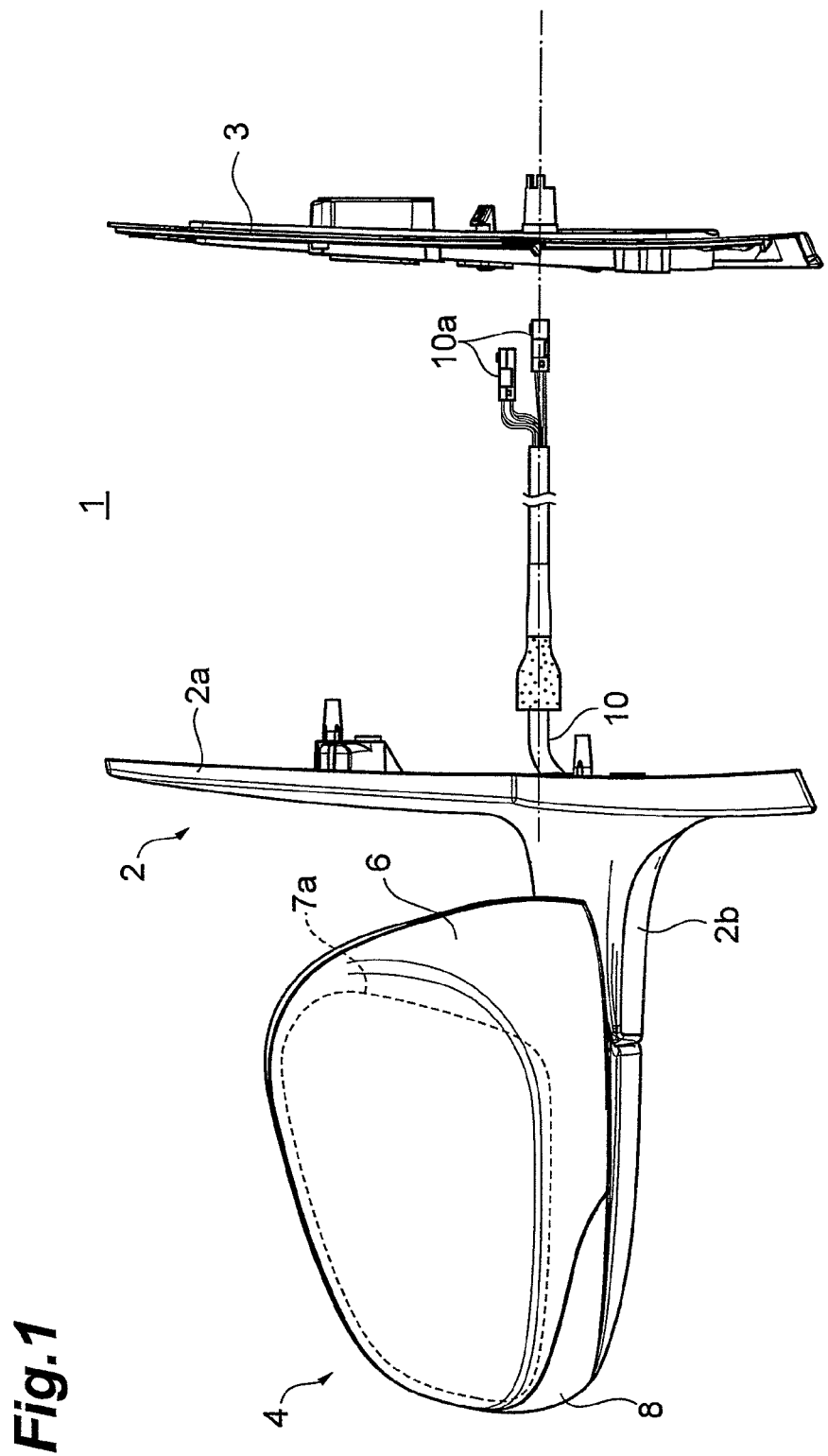
FIG. 1 is a front view showing an embodiment of a door mirror according to the present invention.

As shown in FIG. 1, an electric door mirror 1 is mainly configured by a door mirror base 2 which is fastened to a front door of a vehicle by bolts, a gasket 3 which is arranged between a base main body 2a of the door mirror base 2 and the front door, and a door mirror main body 4 which is pivotably attached to a pedestal portion 2b of the door mirror base 2.

Figure 2:
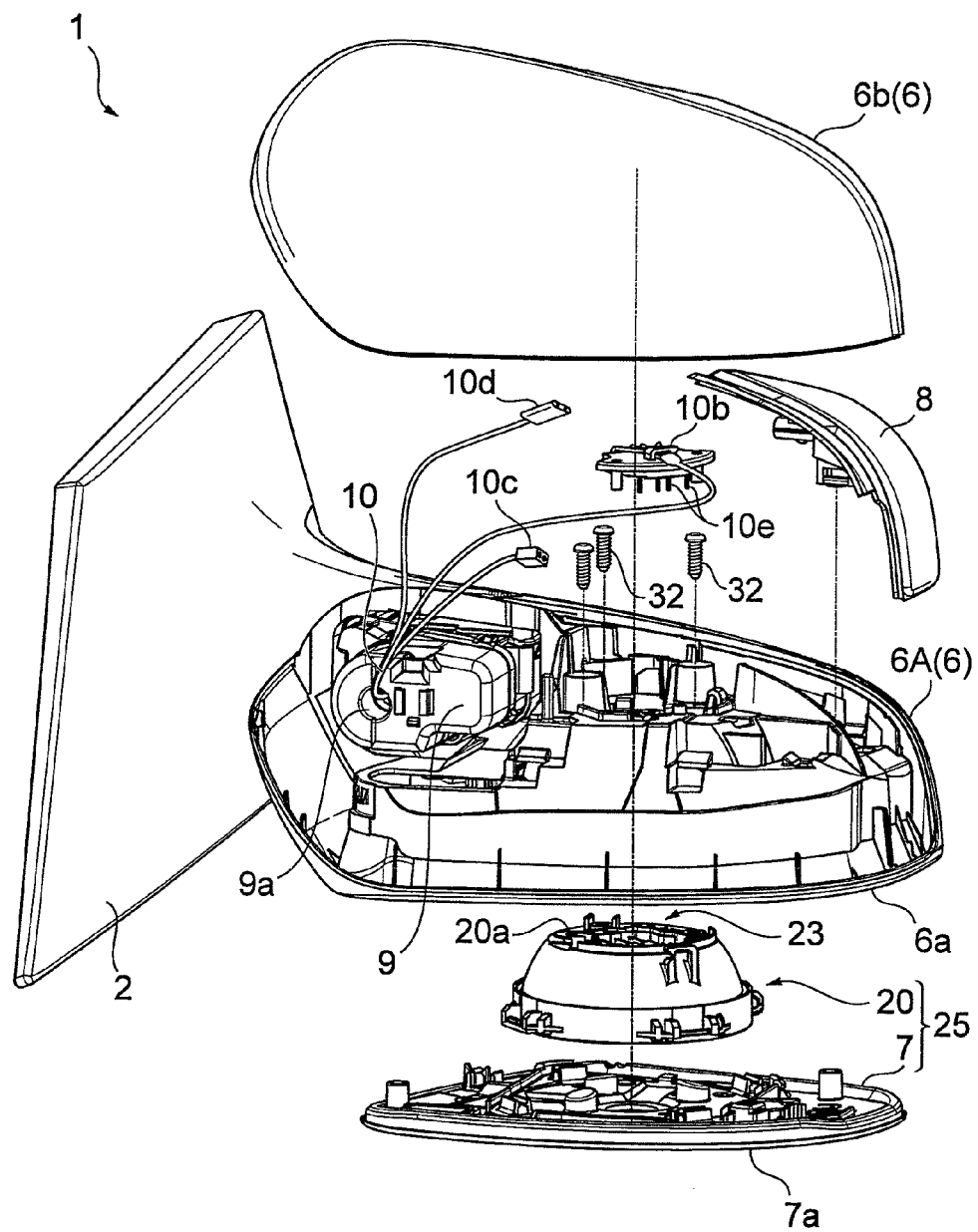
FIG. 2 is a disassembled perspective view of the door mirror.

As shown in FIG. 2, the door mirror main body 4 includes a mirror holder 7 which is arranged on a side of a mirror exposure opening 6a of a mirror housing 6, a mirror surface angle adjusting unit 20 which is fitted to a back face of the mirror holder 7 that is fixed with a mirror 7a on a surface side thereof for adjusting an angle of the mirror holder 7, screws 32 which are fastening components that fixes the mirror surface angle adjusting unit 20 into the mirror housing 6, and an electric storage unit 9 which is attached to the pedestal portion 2b of the door mirror base 2 from above, supports the mirror housing 6, and makes the mirror housing 6 foldable to face the side face of the vehicle, and a turn lamp unit 8 which is fixed to the mirror housing 6.

Further, the electric door mirror 1 is provided with a harness 10 which is wired around in the door mirror base 2 and the door mirror main body 4 for supplying electric power respectively to motors in the mirror surface angle adjusting unit 20, a motor in the electric storage unit 9, and a lamp in the turn lamp unit 8. One end of the harness 10 is provided with a connector portion 10b which is connected to the mirror surface angle adjusting unit 20, a connector portion 10c which is connected to the electric storage unit 9, and a connector portion 10d which is connected to the turn lamp unit 8. The other end of the harness 10 is provided with a connector portion 10a for connecting to wirings in a vehicle (refer to FIG. 1). A side of the other end of the harness 10 is drawn to the vehicle side through the base main body 2a of the door mirror base 2 and the gasket 3.

The mirror housing 6 is configured by a housing main body 6A for accommodating the mirror surface angle adjusting unit 20, the electric storage unit 9, and the mirror holder 7, and a cover member 6b which is disposed on a front side of the housing main body 6A. The cover member 6b is ordinarily painted with a color the same as that of the body of the vehicle. Further, the electric storage unit 9 is fixed to the housing main body 6A and includes a harness drawing hole 9a for passing the harness 10.

Figure 3:
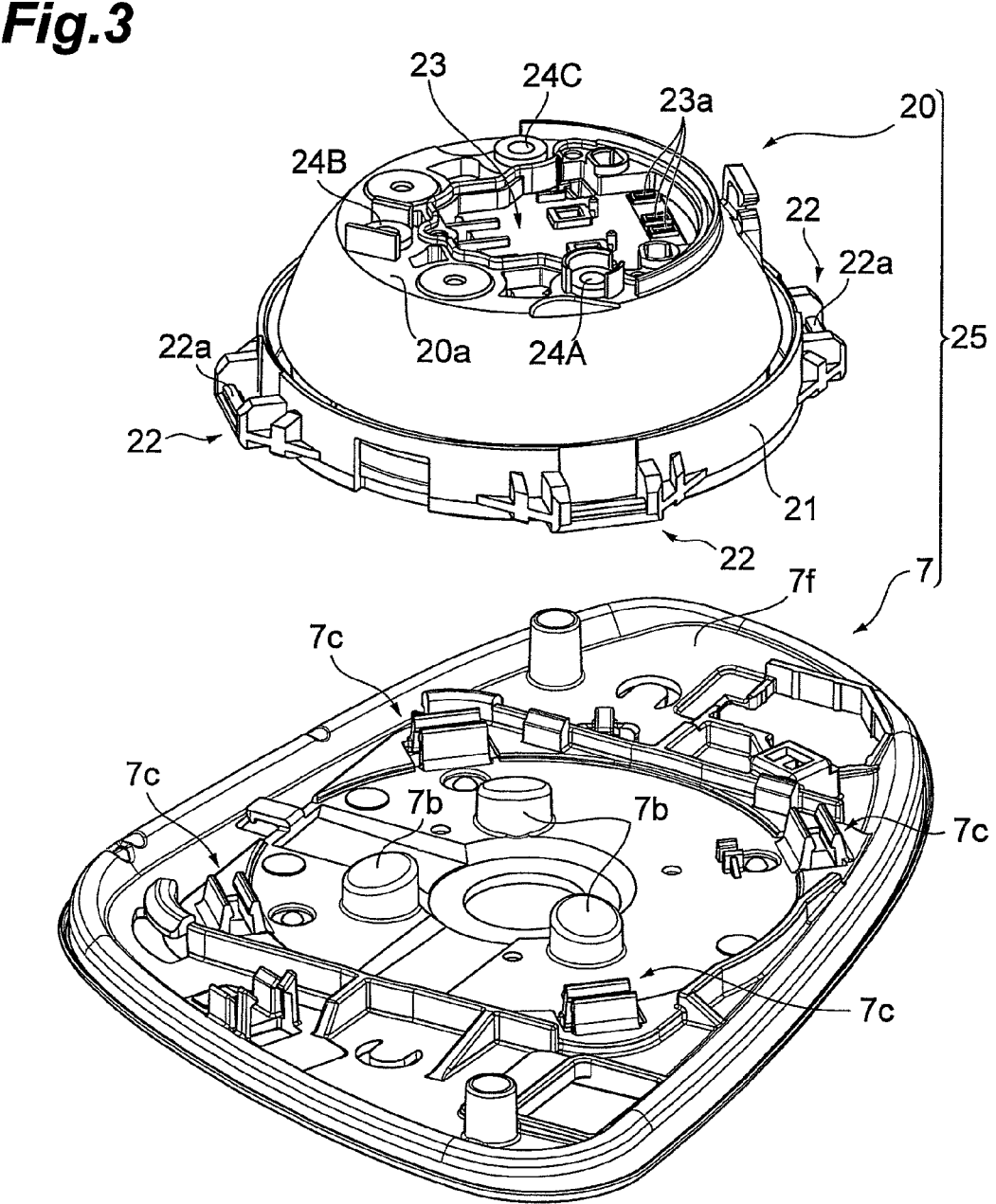
FIG. 3 is a perspective view of a mirror unit assembly.

As shown in FIG. 3, the back face 7f of the mirror holder 7 is formed with four clamp claw portions 7c which are protruded for enabling to fix the mirror surface angle adjusting unit 20, and three protruded portions 7b enabling to position the mirror surface angle adjusting unit 20 relative to the mirror holder 7. Further, at the back face 7f of the mirror holder 7, four clamp claw portions 7c are arranged at equal intervals in a peripheral direction on an outer side of the three protruded portions 7b.

A housing 21 of the mirror surface angle adjusting unit 20 has a circular outer periphery, and the housing 21 is formed with catch portions 22 which are protruded in a diameter direction. Each of the catch portions 22 is provided with a catch bar 22a which is clamped by the clamp claw portion 7c of the mirror holder 7. Also, the housing 21 of the mirror surface angle adjusting unit 20 is formed with positioning holes 21a (refer to FIG. 4) for inserting the protruded portions 7b of the mirror holder 7 respectively.

A back face 20a of the mirror surface angle adjusting unit 20 is provided with a terminal portion 23 in a recessed shape for connecting the connector portion 10b of the harness 10, and in the terminal portion 23 feeding terminals 23a of a female side are arranged. On the other hand, in the connector portion 10b of the harness 10 feeding terminals 10e on a male side (refer to FIG. 2) are arranged, and the feeding terminals 10e and the feeding terminals 23a are electrically connected respectively.

Four sets of the feeding terminals 10e and 23a are provided, two sets of which connect a first motor (not illustrated) in the mirror surface angle adjusting unit 20 and the harness 10, and the other two sets of which connect a second motor (not illustrated) in the mirror surface angle adjusting unit 20 and the harness 10. Incidentally, the first motor tilts a mirror surface in a vertical direction, and the second motor tilts the mirror surface in a horizontal direction.

At a surrounding of the terminal portion 23 having the recessed shape, there are arranged female screw holes (fixing holes) 24A, 24B and 24C for tightening the screws 32 at three locations. Downsizing of the back face 20a of the mirror surface angle adjusting unit 20 can be achieved by arranging the female screw holes 24A, 24B, and 24C at a surrounding of the terminal portion 23 in this way, which contributes to downsizing of the housing 21 of the mirror surface angle adjusting unit 20.

The mirror holder 7 and the mirror surface angle adjusting unit 20 are integrated by cooperative operation of the clamp claw portions 7c and the catch bars 22a to thereby configure a mirror unit assembly 25.

Figure 4:
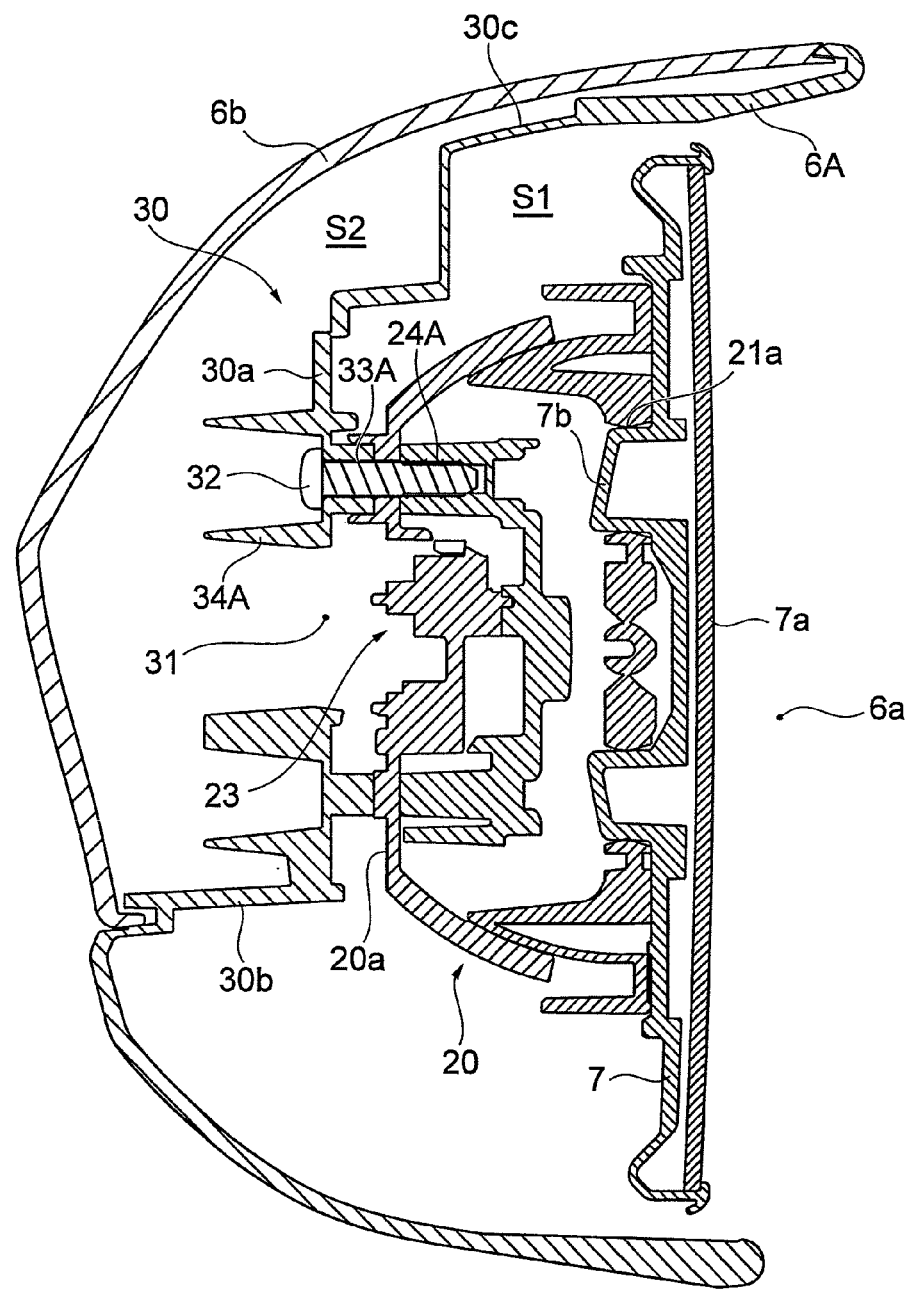
FIG. 4 is a sectional view of the door mirror.
Figure 5:
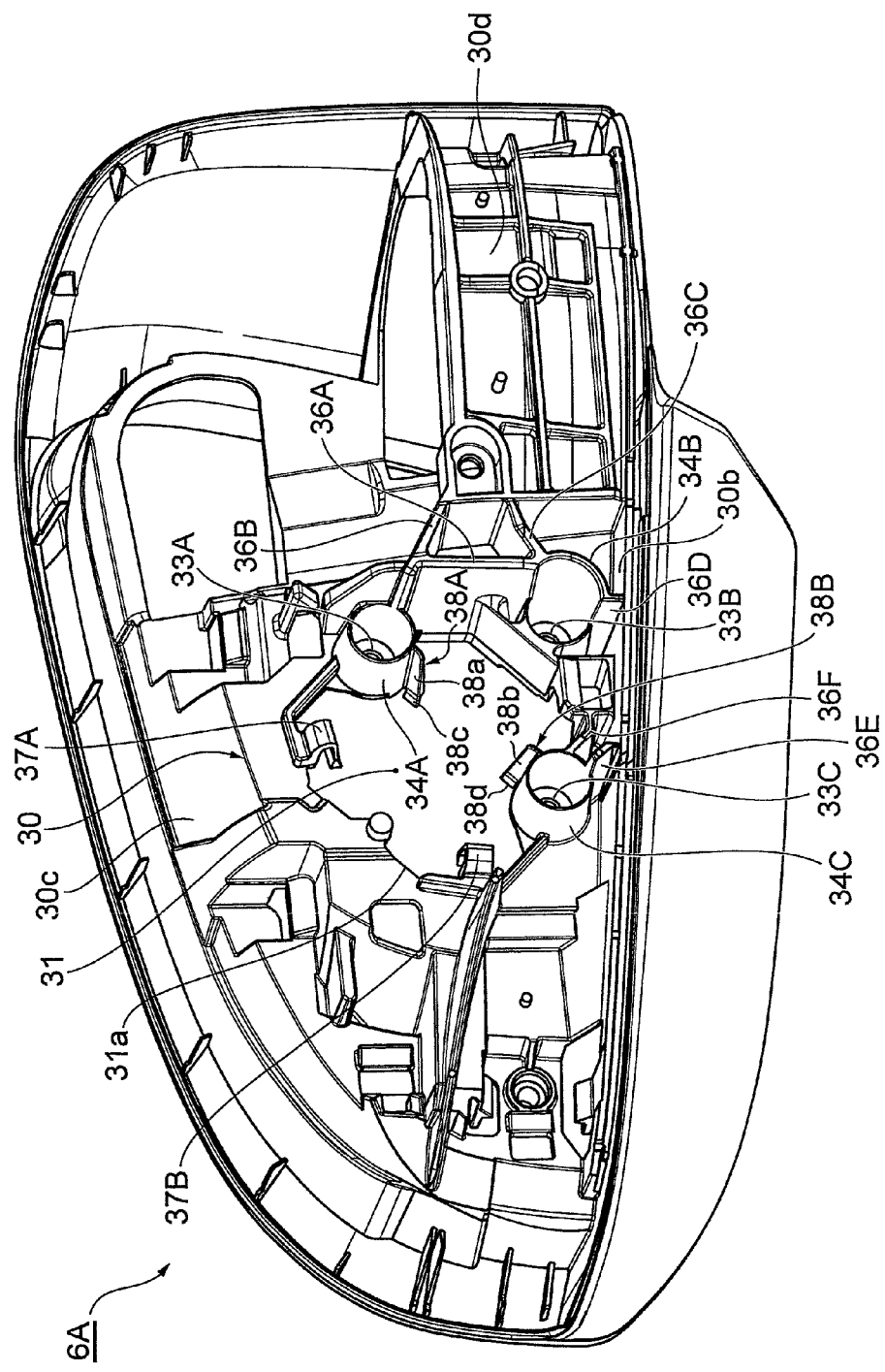
FIG. 5 is a perspective view showing a housing main body of a mirror housing.

As shown in FIG. 4 and FIG. 5, a housing main body 6A of the mirror housing 6 is provided with a partition wall 30 which partitions an inner space of the mirror housing 6. The partition wall 30 includes a main wall portion 30a which partitions the inner space of the mirror housing 6 to front and rear sides, a lower wall portion 30b which is protruded from a lower end of the main wall portion 30a to a front side, and an upper wall portion 30c which is protruded from an upper end of the main wall portion 30a to a rear side, the rear side of the main wall portion 30a forms a mirror accommodating space S1 (second space), and the front side of the main wall portion 30a forms a harness accommodating space S2 (first space). The mirror accommodating space S1 accommodates the mirror unit assembly 25. The harness accommodating space S2 accommodates the harness 10 which is drawn from the mirror surface angle adjusting unit 20 or the like to outside of the electric door mirror 1. The harness 10 is wired around in the harness accommodating space S2. Incidentally, the harness accommodating space S2 is formed by cooperative operation of the partition wall 30 of the housing main body 6A and the cover member 6b, and is opened in a state where the cover member 6b is not attached to the housing main body 6A.

As shown in FIG. 5, at a portion of the partition wall 30 on the vehicle side, there is provided a storage unit accommodating portion 30d which is swelling from the main wall portion 30a to a side of the harness accommodating space S2. The storage unit accommodating portion 30d is disposed on the upside of the pedestal portion 2b of the door mirror base 2, and the upside is opened. The electric storage unit 9 is accommodated in the storage unit accommodating portion 30d from above (refer to FIG. 2) and is fixed by a screw or the like. Also, a rotating shaft (not illustrated) of the electric storage unit 9 which is fixed to the storage unit accommodating portion 30d is fixed to the pedestal portion 2b.

Further, substantially at a center of the main wall portion 30a of the partition wall 30, there is formed an opening portion 31 for exposing the terminal portion 23 of the mirror surface angle adjusting unit 20 to the harness accommodating space S2. At a peripheral edge portion of the opening portion 31, there are formed insertion holes 33A, 33B, and 33C for inserting the screws 32 as fastening components at three locations. The insertion holes 33A, 33B, and 33C are formed at positions in correspondence with the female screw holes 24A, 24B, and 24C of the mirror surface angle adjusting unit 20 described above. The mirror surface angle adjusting unit 20 is fixed to the partition wall 30 by tightening the screws 32 which are inserted from the side of the harness accommodating space S2 to the insertion holes 33A, 33B, and 33C respectively to the female screw holes 24A, 24B, and 24C. Also, the connector portion 10b of the harness 10 is pushed into the opening portion 31 from the side of the harness accommodating space S2, and the connector portion 10b is connected to the terminal portion 23 exposed from the opening portion 31. Incidentally, tightening of the screws 32 and connection of the connector portion 10b can easily be carried out in a state of opening the harness accommodating space S2 before attaching the cover member 6b.

The main wall portion 30a of the partition wall 30 is provided with three reinforcing tube portions 34A, 34B, and 34C in a circular cylinder shape which are protruded to the harness accommodating space S2 by respectively surrounding the insertion holes 33A, 33B, and 33C. The insertion holes 33A and the reinforcing tube portion 34A which are paired are arranged on the upper side of a peripheral edge portion of the opening portion 31 and on a side near to the storage unit accommodating portion 30d. The insertion hole 33B and the reinforcing tube portion 34B which are paired are arranged on the lower of the peripheral edge portion of the opening portion 31 and on the side near to the storage unit accommodating portion 30d. The insertion hole 33C and the reinforcing tube portion 34C which are paired are arranged on the lower side of the peripheral edge portion of the opening portion 31 and on a side remote from the storage unit accommodating portion 30d. Also, the reinforcing tube portion 34A and the reinforcing tube portion 34C are opposed to each other by interposing the opening portion 31 and are disposed to be projected into the opening portion 31.

Further, the main wall portion 30a of the partition wall 30 is provided with reinforcing ribs 36A, 36B, 36C, 36D, 36E, and 36F which are projected into the harness accommodating space S2. The reinforcing rib 36A is connected to the reinforcing tube portion 34A and the reinforcing tube portion 34B. The reinforcing ribs 36B and 36C are connected to the reinforcing rib 36A and the storage unit accommodating portion 30d. The reinforcing rib 36D is connected to the reinforcing tube portion 34B and the lower wall portion 30b of the partition wall 30. The reinforcing rib 36E is connected to the reinforcing tube portion 34C and the lower wall portion 30b of the partition wall 30. The reinforcing rib 36F is connected to the reinforcing tube portion 34C.

In this way, at the peripheral edge portion of the opening portion 31, the reinforcing tube portions 34A, 34B, and 34C are formed to respectively surround the insertion holes 33A, 33B, and 33C and the reinforcing tube portions 34A, 34B, and 34C are projected to the harness accommodating space S2. Thereby, spaces for accommodating the screws 32 are ensured on inner sides of the respective reinforcing tube portions 34A, 34B, and 34C, peripheries of the reinforcing tube portions 34A, 34B, and 34C are reinforced, and thus the peripheral edge portion of the opening portion 31 is reinforced. The opening portion 31 can be enlarged without reducing a strength of the partition wall 30 by reinforcing the peripheral edge portion of the opening portion 31 by the reinforcing tube portions 34A, 34B and 34C in this way, and various advantages in accordance with upsizing of the opening portion 31 can be produced. For example, according to the present embodiment, the terminal portion 23 and the connector portion 10b are upsized in accordance with the opening portion 31, the feeding terminals 23a and 10e are concentrated to the terminal portion 23 and the connector portion 10b to reduce a number of the connector portion 10b to one, and the assembling operation performance is improved. Also, one kind of the mirror housing 6 can be applied to various mirror surface angle adjusting units having different shapes and sizes of terminal portions from each other, and the mirror housing 6 can also be made common in plural kinds of door mirrors.

Further, the reinforcing tube portions 34A, 34B, and 34C are further reinforced by the reinforcing ribs 36A to 36F, and therefore, the peripheral edge portion of the opening portion 31 can further firmly be reinforced.

Further, a portion between the reinforcing tube portion 34A and the reinforcing tube portion 34B is reinforced by the reinforcing rib 36A which is connected to the reinforcing tube portion 34A and the reinforcing tube portion 34B, and therefore, the peripheral edge portion of the opening portion 31 can further firmly be reinforced.

Further, the reinforcing rib 36A is further connected to the storage unit accommodating portion 30d by the reinforcing rib 36B and the reinforcing rib 36C. A load which is applied on the mirror housing 6 by a wind pressure or the like during vehicle running concentrates on the storage unit accommodating portion 30d, and therefore, the storage unit accommodating portion 30d is designed to have a high strength. The reinforcing tube portions 34A and 34B are further solidly reinforced by connecting the reinforcing tube portions 34A and 34B to the storage unit accommodating portion 30d which is designed to have the high strength in this way via the reinforcing ribs 36A, 36B, and 36C. In addition thereto, the reinforcing tube portions 34A and 34B are arranged to the side near to the storage unit accommodating portion 30d, and therefore, the reinforcing tube portions 34A and 34B are further solidly reinforced. Therefore, the peripheral edge portion of the opening portion 31 can further firmly be reinforced.

Further, the reinforcing rib 36D is connected to the reinforcing tube portion 34B and the lower wall portion 30b of the partition wall 30, and the reinforcing rib 36E is connected to the reinforcing tube portion 34C and the lower wall portion 30b of the partition wall 30. In this way, the reinforcing tube portions 34B and 34C which are provided at the main wall portion 30a of the partition wall 30 are further solidly reinforced by being connected to the lower wall portion 30b of the partition wall 30. In addition thereto, the reinforcing tube portions 34B and 34C are arranged on the downside, that is, the side near to the lower wall portion 30b of the partition wall 30, and therefore, the reinforcing tube portions 34B and 34C are further solidly fixed. Therefore, the peripheral edge portion of the opening portion 31 can further firmly be reinforced.

The peripheral edge portion 31a of the opening portion 31 is provided with two claw portions 37A and 37B for preventing detachment of the connector portion 10b which is connected to the terminal portion 23. The respective claw portions 37A and 37B are formed into a U-like hook shape which is projected to the harness accommodating space S2 along an axis line L1 of pushing the connector portion 10b (refer to FIG. 6), and is folded to bend on a side of the opening portion 31 at the midway. Further, the claw portions 37A and 37B are arranged to align at a portion of the peripheral edge portion 31a of the opening portion 31 that is opposed to a line of connecting a center of the reinforcing tube portion 34A and the center of the reinforcing tube portion 34C, the claw portion 37A is disposed on a side of the reinforcing tube portion 34A, and the claw portion 37B is disposed on a side of the reinforcing tube portion 34C.

Further, at portions of peripheral faces 34a and 34c of the reinforcing tube portions 34A and 34C which are projected into the opening portion 31, there are respectively provided guide portions 38A and 38B which restrict movement of the connector portion 10b in a direction orthogonal to the pushing axis line L1 when the connector portion 10b is pushed to the terminal portion 23. The respective guide portions 38A and 38B are formed into shapes of plates which are extended along the pushing axis line L1, one face of the one guide portion 38A is opposed to the one claw portion 37A, and one face of the other guide portion 38B is opposed to the other claw portion 37B. In this way, the guide portions 38A and 38B are projected into the opening portion 31 by using the reinforcing tube portions 34A and 34C.

Furthermore, at end portions of the guide portions 38A and 38B on the side of the terminal portion 23, there are formed auxiliary claw portions 38c and 38d which are extended to a side of the terminal portion 23. The auxiliary claw portions 38c and 38d are formed into shapes of plates having wall thicknesses thinner than those of guide main body portions 38a and 38b of the guide portions 38A and 38B, and respectively opposed to the claw portions 37A and 37B. Further, the auxiliary claw portions 38c and 38d are tilted to be respectively proximate to the claw portions 37A and 37B as proceeding to the terminal portion 23 (refer to FIG. 7).

Figure 6:
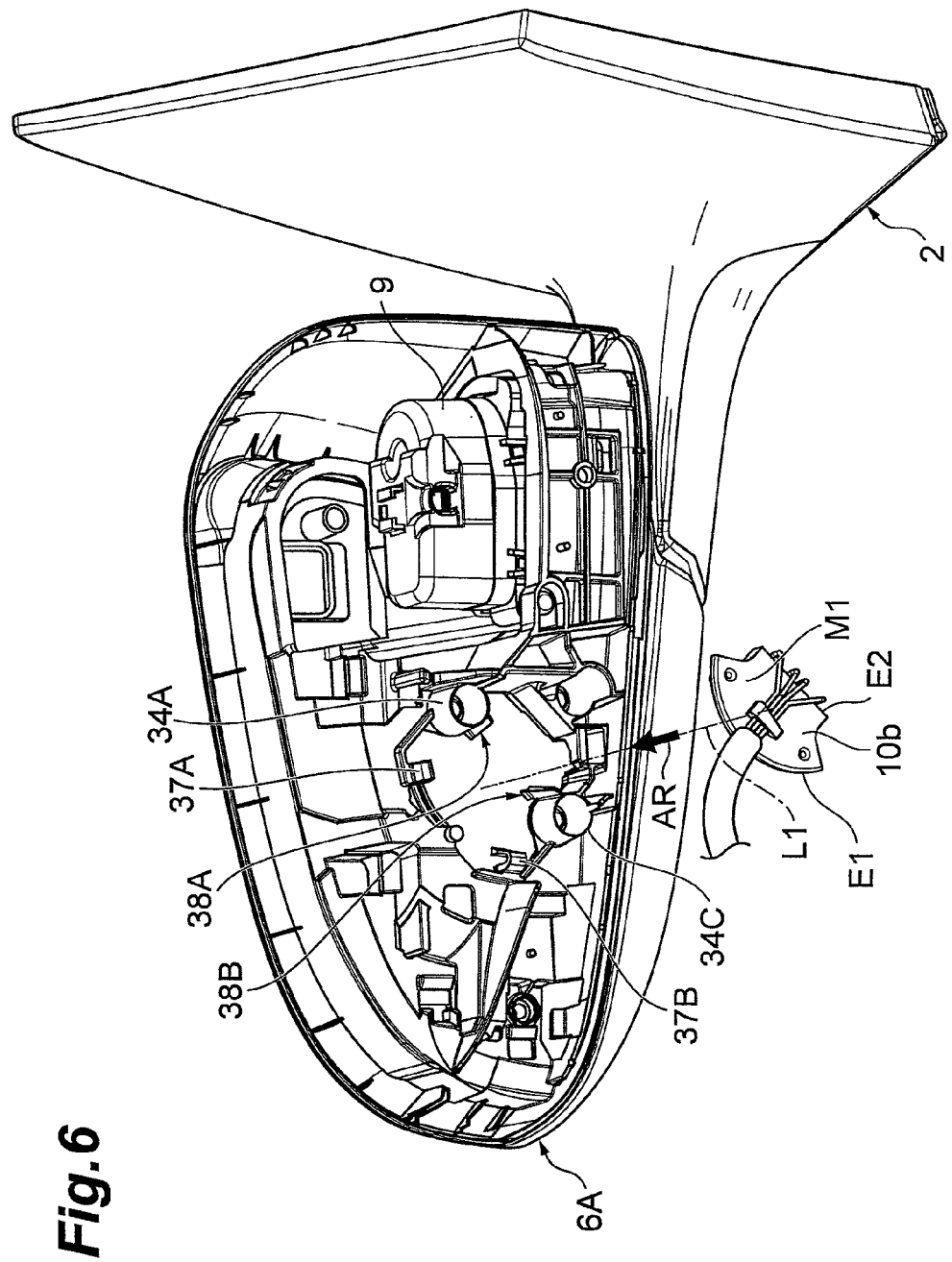
FIG. 6 is a perspective view showing a relationship among a terminal portion, an opening portion, and a connector portion.

As shown in FIG. 6, an outer edge of the connector portion 10b is formed with an edge portion E1 in a shape of a circular arc to be engaged with the claw portions 37A and 37B, and an edge portion E2 in a linear shape to be engaged with the guide portions 38A and 38B to be opposed to the edge portion E1. When the connector portion 10b is pushed to the terminal portion 23, the edge portion E1 is brought into contact with the respective claw portions 37A and 37B, and the edge portion E2 is brought into contact with the respective guide portions 38A and 38B.

Figure 7:
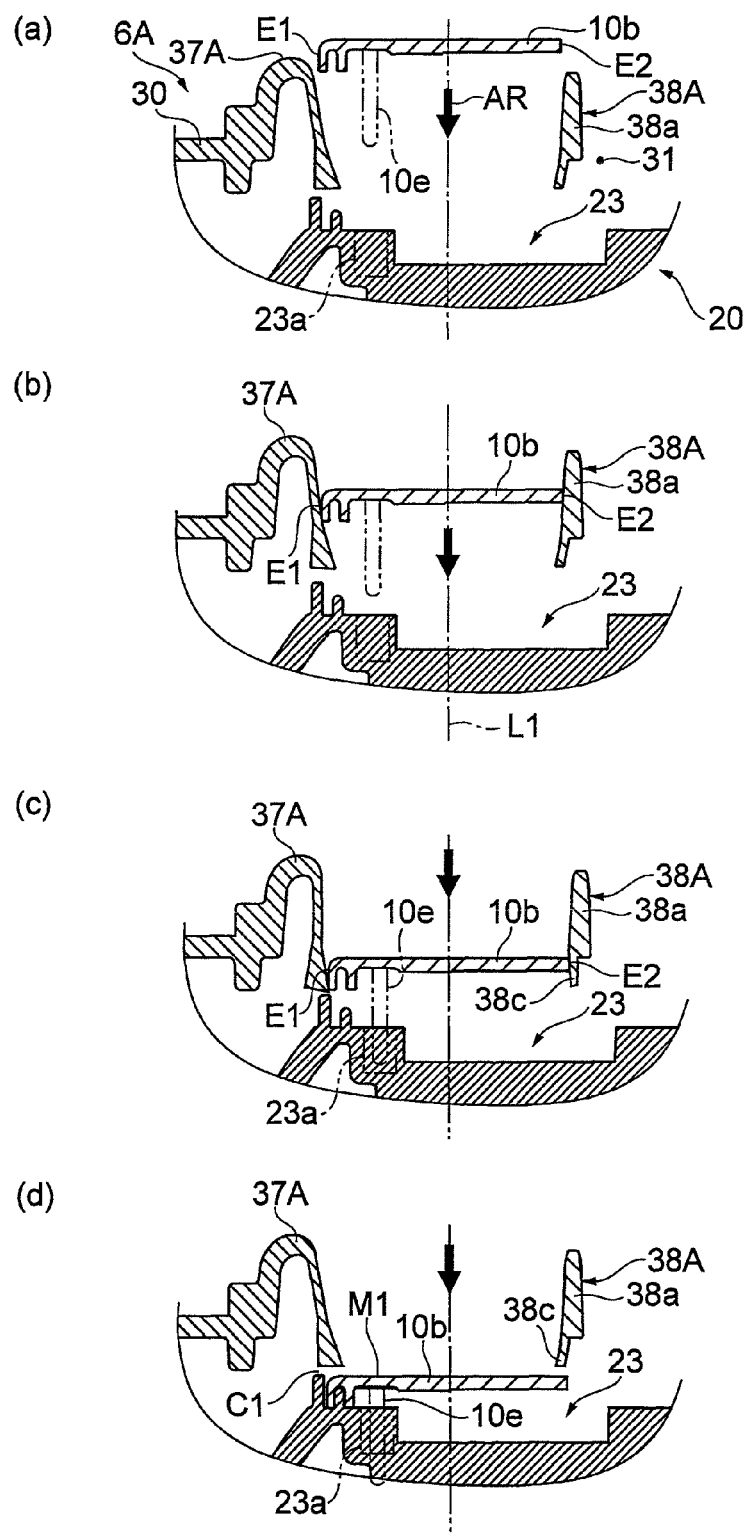
FIG. 7 illustrate sectional views showing states of a claw portion and a guide portion when the connector portion is connected.

FIG. 7 illustrate sectional views showing states of the claw portion and the guide portion when the connector portion 10b is connected, FIG. 7(a) shows a state before pushing the connector portion 10b, FIG. 7(b) and FIG. 7(c) show states in the midst of pushing, and FIG. 7(d) shows a state in which the connector portion 10b is finished to be pushed. When the connector portion 10b is pushed to the terminal portion 23 in an arrow mark AR direction from the state of FIG. 7(a), as described above, the edge portion E1 is brought into contact with the claw portions 37A and 37B, and the edge portion E2 is brought into contact with the guide portions 38A and 38B. Further, as shown in FIG. 7(b), the claw portions 37A and 37B are pushed by the edge portion E1, and are elastically deformed in a direction orthogonal to the pushing axis line L1. At this occasion, the guide portions 38A and 38B restrict the movement of the connector portion 10b against elastic forces of the claw portions 37A and 37B. Therefore, a positional shift of the connector portion 10b relative to the terminal portion 23 is prevented, and the connector portion 10b can firmly and easily be pushed to the terminal portion 23.

Further, as described above, the claw portions 37A and 37B are formed into the U-like hook shape. Therefore, in comparison with those formed into a shape of simply projecting to the harness accommodating space S2, a length from a root portion to a tip end portion of the claw portions 37A and 37B each is prolonged. That is, an elastically deformable portion is prolonged. Therefore, an elastic force of the claw portions 37A and 37B each is reduced, and a force of clamping the connector portion 10b by the claw portions 37A and 37B and the guide portions 38A and 38B is reduced. Therefore, the connector portion 10b can be pushed by a smaller force.

When the connector portion 10b is further pushed, the connector portion 10b reaches positions of the auxiliary claw portions 38c and 38d which are formed at end portions of the guide portions 38A and 38B on the side of the terminal portion 23. Then, as shown in FIG. 7(c), the auxiliary claw portions 38c and 38d are pushed by the edge portion E2, and are elastically deformed to a side reverse to that of the claw portions 37A and 37B. At this occasion, the elastic force of the claw portions 37A and 37B and an elastic force of the auxiliary claw portions 38c and 38d are balanced, and the positional shift of the connector portion 10b relative to the terminal portion 23 is prevented.

When the connector portion 10b is further pushed, as shown in FIG. 7(d), the connector portion 10b is connected to the terminal portion 23. When the connector portion 10b proceeds from a state of FIG. 7(c) to a state of FIG. 7(d), the claw portions 37A and 37B and the auxiliary claw portions 38c and 38d are elastically recovered to be opposed to a back face M1 of the connector portion 10b. It can clearly be recognized that the connector portion 10b is connected to the terminal portion 23 by sound or feeling when the claw portions 37A and 37B are elastically recovered. Also, the detachment of the connector portion 10b after connection is prevented by the claw portions 37A and 37B which are elastically recovered to be opposed to the back face M1 of the connector portion 10b. Further, the claw portions 37A and 37B as well as the auxiliary claw portions 38c and 38d are opposed to the back face M1 of the connector portion 10b. Therefore, the detachment of the connector portion 10b can further firmly be prevented by cooperative operation of the claw portions 37A and 37B and the auxiliary claw portions 38c and 38d.

Furthermore, in a state where the connector portion 10b is finished to be pushed, a gap C1 is produced between the back face M1 of the connector portion 10b and the claw portions 37A and 37B. Thereby, the claw portions 37A and 37B can firmly be elastically recovered, and the sound or the feeling when the claw portions 37A and 37B are elastically recovered can be made clearer.

Further, the feeding terminal 23a of the terminal portion 23 and the feeding terminal 10e of the connector portion 10b are made to be connected to each other before the claw portions 37A and 37B are elastically recovered (refer to FIG. 7(c)). Thereby, even when the connector portion 10b moves back to the side of the claw portions 37A and 37B by an amount of the gap C1, connection of the feeding terminal 23a and the feeding terminal 10e is ensured.

Although the explanation has been given of the preferred embodiments of the present invention as described above, the present invention is not necessarily limited to the embodiment described above but can variously be changed within the range of not changing the gist. For example, numbers and positions of the claw portions 37A and 37B and the guide portions 38A and 38B may pertinently be changed in accordance with a size, a shape or the like of the connector portion 10b. Also, sectional shapes of the reinforcing tube portions 34A, 34B, and 34C are not limited to a circular shape, but reinforcing tube portions having various sectional shapes of a polygonal shape and the like may pertinently be adopted. Also, the fastening component for fixing the mirror surface angle adjusting unit 20 into the mirror housing 6 is not limited to the screw 32, but a driving fit pin or the like may be adopted as a fastening component. Further, a number of the fastening components may pertinently be changed in accordance with a required strength, and a number of the reinforcing tube portions or the like may pertinently be changed in accordance therewith.

What is claimed is:

1. A door mirror comprising a mirror holder fixed with a mirror, a mirror surface angle adjusting unit for adjusting an angle of the mirror holder, and a mirror housing for accommodating the mirror holder and the mirror surface angle adjusting unit;
   wherein a back face side of the mirror surface angle adjusting unit is provided with a terminal portion to which a feeding connector portion of a harness for supplying an external power is connected;
   wherein the mirror housing is provided with a partition wall for partitioning an inner space of the mirror housing to a first space on a front side and a second space on a rear side;
   wherein the partition wall is provided with an opening portion for exposing the terminal portion of the mirror surface angle adjusting unit accommodated in the second space to the first space; and
   wherein a peripheral edge portion of the opening portion is provided with:
   a claw portion elastically deformed in a direction orthogonal to a direction of pushing the feeding connector portion by the feeding connector portion when the feeding connector portion is pushed to the terminal portion from a side of the first space, and elastically recovered to be opposed to a back face of the feeding connector portion in the midst of pushing the feeding connector portion; and
   a guide portion extended along the pushing direction to be opposed to the claw portion for restricting a movement of the feeding connector portion against an elastic force of the claw portion.

2. The door mirror according to claim 1, wherein an end portion of the guide portion on a side of the terminal portion is formed with an auxiliary claw portion elastically deformed in the direction orthogonal to the pushing direction by the feeding connector portion and elastically recovered to be opposed to the back face of the feeding connector portion in the midst of pushing the feeding connector portion.

3. The door mirror according to claim 1, wherein the claw portion is formed into a U-like hook shape projected to the first space along the pushing direction and folded to bend on a side of the opening portion at a middle thereof.

4. The door mirror according to claim 1, further comprising a plurality of fastening components for fixing the mirror surface angle adjusting unit in the mirror housing;
   wherein the back face side of the mirror surface angle adjusting unit is further provided with a plurality of fixing portions to which the plurality of fastening components is fastened;
   wherein the partition wall is further provided with a plurality of insertion holes disposed to surround the opening portion for penetrating the plurality of fastening components to be fixed to the plurality of fixing portions from a side of the first space, and a plurality of reinforcing tube portions surrounding the respective insertion holes and projected to the first space along the pushing direction; and
   wherein the guide portion is provided at a peripheral face of the reinforcing tube portion.

* * * * *